(12) United States Patent
Fath et al.

(10) Patent No.: US 6,347,684 B1
(45) Date of Patent: Feb. 19, 2002

(54) MOBILE HUNTER'S STAND

(76) Inventors: Dale C. Fath, 13751 W. Hartford, Tonkawa, OK (US) 74653; Tom G. Cannon, 1404 Cheryl La., Blackwell, OK (US) 74631

( * ) Notice: Subject to any disclaimer, the term of this patent is extended or adjusted under 35 U.S.C. 154(b) by 0 days.

(21) Appl. No.: 09/373,085

(22) Filed: Aug. 12, 1999

(51) Int. Cl.[7] .................................. E04C 1/00
(52) U.S. Cl. ..................... 182/63.1; 182/127
(58) Field of Search ............... 182/127, 63.1, 182/116, 115, 129; 136/901

(56) References Cited

U.S. PATENT DOCUMENTS

| | | | | |
|---|---|---|---|---|
| 2,854,705 A | * | 10/1958 | McClaran | |
| 2,980,124 A | * | 4/1961 | Atchison | |
| 3,220,766 A | * | 11/1965 | Kates | 182/116 |
| 3,473,627 A | * | 10/1969 | Repka | 182/63.1 |
| 4,442,919 A | * | 4/1984 | Fulcher | 182/63.1 |
| 5,409,081 A | * | 4/1995 | Reeves | 182/63.1 |
| 6,012,546 A | * | 1/2000 | Beg | 182/109 |

* cited by examiner

*Primary Examiner*—Alvin Chin-Shue
(74) *Attorney, Agent, or Firm*—Hovey, Williams, Timmons & Collins

(57) ABSTRACT

A mobile tower (10) designed for use as a hunting stand is provided and includes a wheeled mobile carriage (12) permanently affixed to and supporting a platform assembly (14). The platform assembly (14) includes a base (32) equipped with oblique earth-penetrating elements (39) as well as an upper housing (40). A pull tongue (16) is pivotally coupled to the carriage (12) or platform assembly (14) and is adapted for attachment to a towing vehicle. In use, the tower (10) is towed to an appropriate site and is erected by pivoting of the platform assembly (14) to an upright ground-engaging position by exerting a pushing force through the tongue (16).

8 Claims, 3 Drawing Sheets

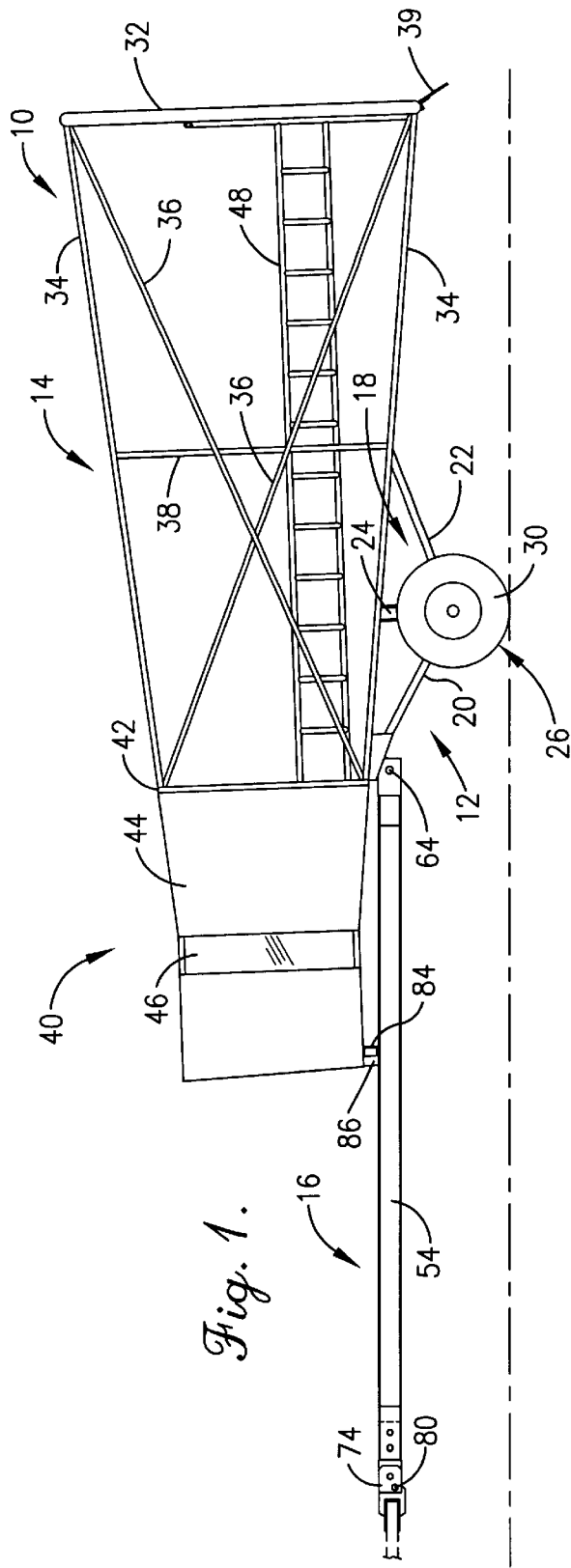

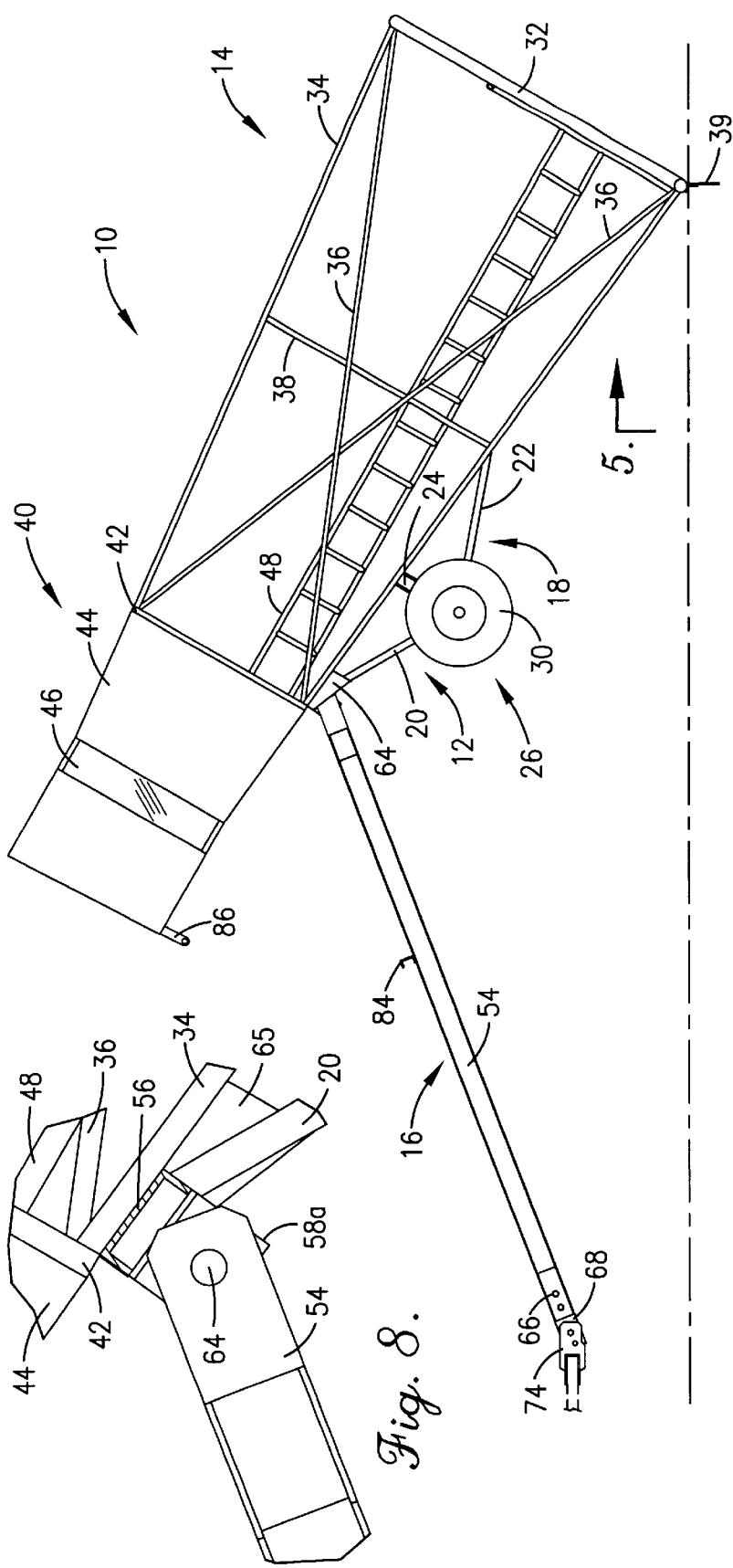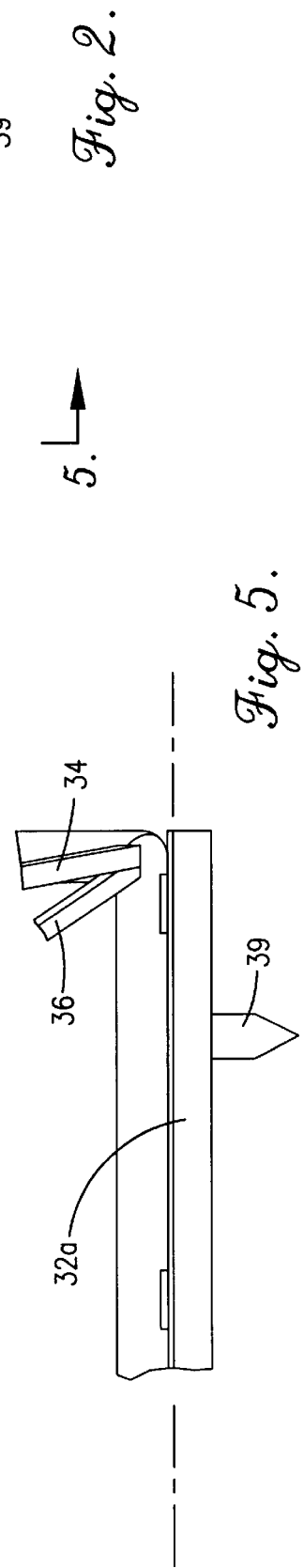

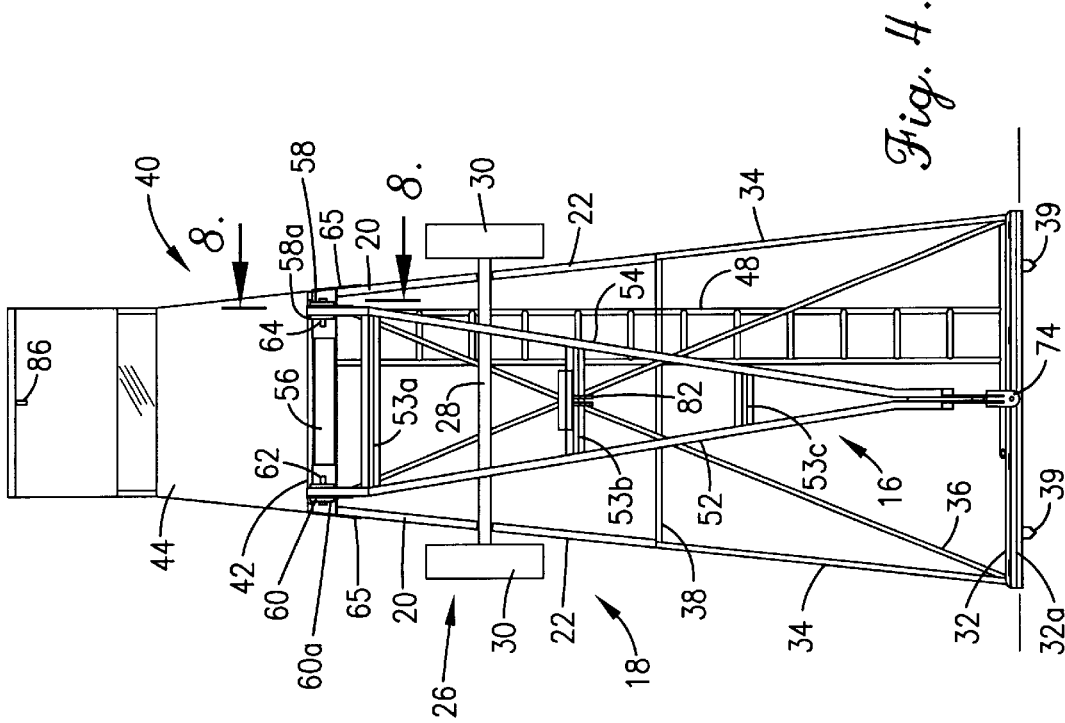

MOBILE HUNTER'S STAND

BACKGROUND OF THE INVENTION

1. Field of the Invention

The present invention is broadly concerned with a mobile tower which can be used as a hunter's stand or for other purposes where a temporary elevated platform is desired. More particularly, the invention pertains to such a mobile tower which includes a mobile carriage supporting a platform assembly; the platform assembly may be selectively moved from a generally horizontal towing position to an upright use position at the discretion of the user.

2. Description of the Prior Art

Deer and other big-game hunters often make use of stands which permit a hunter to position himself at an elevated location close to a source of water or other locale frequented by game. A variety of stands have been proposed in the past for this purpose. Some of these prior designs have been small and designed for temporary attachment to trees. While these stands serve a useful purpose, they do not protect a hunter from the weather, and moreover can only be mounted at relatively low heights.

Hunters have also built permanent towers at desirable hunting sites which overcome many of the problems of tree-attached stands. However, such permanent units are only feasible in limited situations where a permanent construction is permitted and appropriate.

There is accordingly a need in the art for a relatively large mobile tower usable as a hunter's stand and which can be easily towed to a desired location for erection. Obviously, such a tower must be designed so that it can be readily erected and lowered, without the need for specialized equipment or excess manpower.

SUMMARY OF THE INVENTION

The present overcomes the problems outlined above, and provides an improved mobile tower including a mobile carriage adapted to be towed by a pulling vehicle with a platform assembly operatively secured to the carriage. The platform assembly is selectively movable between a generally horizontal towing position and a generally upright use position, and preferably includes a flat base as well as an uppermost housing.

In more detail, the mobile tower of the invention is equipped with a carriage permanently secured to the platform assembly so that the carriage is raised and lowered along with the platform. In order to permit ready erection and lowering of the platform assembly, an elongated pull tongue is pivotally coupled to the carriage or assembly and is adapted for attachment to a towing vehicle, and a latch arrangement serves to releasably secure the upper end of the platform assembly to the tongue. In addition, one or more earth-penetrating elements are secured to the platform assembly adjacent the base thereof.

In use, the tower is towed to a desired location, delatched from the pull tongue and initially pivoted upwardly until the earth-penetrating elements contact the ground. The pulling vehicle is then slowly reversed, causing the tower to pivot upwardly and ultimately assume its full upright position with the base thereof fully contacting the earth. The user may then ascend the platform assembly using a ladder, and enter the uppermost housing of the platform assembly.

BRIEF DESCRIPTION OF THE DRAWINGS

FIG. 1 is an elevational view of a mobile tower in accordance with the invention, shown in its towing position;

FIG. 2 is a side view similar to that of FIG. 1, but showing the tower during erection of the platform assembly thereof;

FIG. 3 is a side view of the tower with the platform assembly fully erected;

FIG. 4 is a front view of the tower with the platform assembly fully erected;

FIG. 5 is a fragmentary view taken along line 5—5 of FIG. 2 and illustrating the preferred platform assembly base construction with elongated, earth-penetrating elements secured thereto;

FIG. 6 is a fragmentary view depicting the construction of the forward end of the pull tongue of the tower of the invention;

FIG. 7 is a fragmentary view in partial vertical section illustrating the releasably latch mechanism used to secure the platform assembly in its generally horizontal towing position; and FIG. 8 is a fragmentary view in partial vertical section taken along line 8—8 of FIG. 4 and depicting the pivotal connection of the pull tongue to the carriage of the tower.

DETAILED DESCRIPTION OF THE PREFERRED EMBODIMENT

Turning now to the drawings and particularly FIG. 1, a mobile tower 10 designed for use by hunters or others requiring an elevated platform at selected use positions is illustrated. The tower 10 broadly includes a wheeled mobile carriage 12 supporting an elongated platform assembly 14, with an elongated, pivotally coupled bifurcated pull tongue 16. The tower 10 is designed to permit towing of the platform assembly in the generally horizontal orientation as shown in FIG. 1, while also allowing easy erection thereof to a fully upright use position at virtually any desired site.

In more detail, the carriage 12 includes a framework 18 including obliquely oriented struts 20, 22 and upright central reinforcing channel 24, which are secured to the platform assembly 14. The framework supports a wheel unit 26, including a cross axle 28 and tires 30.

The platform assembly 14 includes a generally square framework base 32 with upwardly extending, corner-mounted frame angles 34 and reinforcements including crossed, oblique angles 36 and transverse angles 38 extending between the corner frame angles 34. As will be readily appreciated, the base 32 and upstanding framework comprising the angles 34–38 are all welded to form a strong, rigid, generally trapezoidal structure. It will also be seen that the lower leg 32a (see FIG. 5) of base 32 is equipped with a pair of laterally spaced apart, obliquely oriented, pointed, earth-penetrating elements 39.

As best seen in FIG. 4, the carriage 12 is permanently affixed to the platform assembly 14. Specifically, the upper ends of the struts 20, 22 are welded to the adjacent frame angles 34, whereas the channel 24 is connected to the proximal oblique angles 36.

The upper end of the platform assembly 14 comprises a housing 40 adapted to conceal a user. The housing has a lower transverse deck 42 as well as upstanding sidewalls 44 and roof 46. Each sidewall 44 has a pivotally mounted, openable window 46 formed therein. A permanent ladder 48 extends from a point adjacent housing 40 downwardly to base 32. A housing entryway door 50 is provided in the deck 42 of housing 40 adjacent ladder 48.

The tongue 16 comprises a pair of spaced beams 52, 54 which converge from the rearward to the forward ends thereof and are interconnected by spaced cross members 53a, 53b and 53c. The rearward end of the tongue 16 is pivotally coupled to the forward end of carriage 12 as best seen in FIGS. 4 and 8. In particular, a crossbeam channel 56 is provided immediately below deck 42 and is welded to the upper ends of the adjacent angles 34. A pair of beam mounts 58, 60 extend downwardly from the ends of channel 56 and comprise a pair of spaced apart, apertured plates 58a, 60a. Each set of plates 58a, 60a is adapted to receive the end of an associated beam 54, 52; the beam ends are also apertured as seen in FIG. 8, and crosspins 62, 64 extend through the aligned mount and beam apertures. Forward, generally triangular gusset plates 65 provide additional strength for the pivotal connection of the tongue 16.

The forward end of tongue 16 is adapted to be secured to a pulling vehicle. To this end, the beams 52, 54 are joined by connectors 66, with a projecting plate 68 sandwiched between the forward beam ends as illustrated in FIG. 6. The plate 68 includes a pair of spaced apertures 70, 72 therethrough. A bifurcated hitch component 74 is pivotally coupled to the forward end of plate 68 by means of a pivot pin 76 which extends through the aperture 70 and aligned openings provided in the side pieces of the hitch component. The hitch component further has an opening 78 which is adapted for alignment with plate opening 72. A removable pin 80 permits attachment of the component 74 in an aligned relationship relative to the plate 68 and tongue beams 52, 54 as illustrated in FIG. 1. This constitutes the towing position for the forward end of 31 the tongue 16.

Referring to FIGS. 1 and 7, it will be observed that intermediate cross member 53b carries a pair of laterally spaced apart, apertured latch plates 82 and an upright standoff channel 84. In addition, a central, apertured locking tongue 86 is secured to the upper end of housing 40. In order to lock the platform assembly 14 in its generally horizontal towing position, the platform assembly 14 is pivoted about the axis defined by pins 62, 64 so that tongue 86 passes between the plates 82 and the housing 40 rests atop channel 84. A detachable crosspin 88 is then inserted through the aligned openings in the plates 82 and tongue 86.

OPERATION

As explained previously, the towing position of the tower 10 is illustrated in FIG. 1. In this orientation, the platform assembly 14 is pivoted to its generally horizontal location and the tongue 86 is latched to the plates 82 via pin 88. Also, at the forward end of the tongue 16, the hitch component 74 is placed in aligned orientation with the tongue by means of pins 78. Thus, a standard hitch may be coupled with the component 74, and the entire tower 10 may be pulled behind a vehicle such as a truck or the like.

When the user reaches a desired site, it is a simple matter to erect the tower 10 to the use position depicted in FIGS. 3–4. In particular, the user removes the pins 80 and 88 and then pivots the platform assembly 14 about the pins 62, 64 until the base elements 39 contact and at least slightly penetrate the earth. Next, the user exerts a rearward pushing force through the tongue 16 (typically by backing the towing vehicle) so that the assembly 14 is pivoted upwardly essentially about the earth-contacting leg 32a of base 32. As the assembly 14 goes over center, the force of gravity assists in the tower erection, this being controlled owing to the interconnection between the tongue 16 and the towing vehicle. When the platform 14 fully rests on the earth as shown in FIGS. 3–4, the user need only detach the tongue 16 from the towing vehicle, followed by moving the tongue to a bracing position best shown in FIG. 3. That is, the component 74 is placed in abutting contact with the earth so as to provide a wind brace for the tower.

The user may then ascend ladder 14 and enter housing 40 via door 50. As necessary, the windows 46 may be opened to allow the shooting of weapons or the like from the housing.

When the use of tower 10 is finished, the above-described procedure is merely reversed. That is, the tongue 16 is lifted from its oblique bracing position shown in FIG. 3, and the component 74 is attached to the towing vehicle. The vehicle is then driven slowly forwardly, causing the platform assembly 14 to again pivot essentially about base leg 32a until the carriage tires 30 contact the earth. Further vehicle movement and, as necessary, manual manipulation of the assembly 14 causes the assembly 14 to reassume the horizontal towing position. Finally, the component 74 is affixed in its aligned position using pin 78 and the latch pin 88 is reinserted through tongue 86, allowing the entire tower 10 to be towed from the site.

We claim:

1. A mobile tower comprising:

a mobile carriage adapted to be towed by a pulling vehicle;

a platform assembly operably secured to said mobile carriage and selectively movable between a towing position where the platform assembly is in a generally horizontal orientation and a use position wherein the platform assembly is generally upright, said platform assembly presenting a lower ground-engaging base and an upper end;

an elongated pull tongue pivotally connected to one of said mobile carriage and platform assembly and adapted for connection with a towing vehicle; and an elongated ground-penetrating element fixed to said base and extending from an outer edge of a ground engaging surface of said base and at an obtuse angle to said base to extend below the base when said base is in said use position, and, upon pivoting of the platform assembly about a horizontal axis during movement of the platform assembly between said towing and use positions, said element first contacts the earth.

2. The tower of claim 1, said pull tongue being pivotally connected to said carriage.

3. The tower of claim 1, said carriage being permanently secured to said platform assembly.

4. The tower of claim 1, including a latch for releasably securing said platform assembly to said pull tongue when said platform assembly is in said towing position.

5. The tower of claim 4, said latch comprising a pair of interfitted, apertured locking members respectively carried by said platform assembly and tongue, and a pin insertable through said locking members.

6. A method of erecting a mobile tower including a mobile carriage and a platform assembly carried by said carriage and presenting a lower ground-engaging base and an upper end, there being an elongated pull tongue pivotally coupled to either said carriage or platform assembly, said method comprising the steps of:

stopping said tower at a desired use location; and erecting said platform assembly by causing said base to contact the earth and exerting a pushing force on said pull tongue in order to pivot the platform assembly upwardly until the platform assembly assumes an upright orientation with said base thereof engaging the earth.

7. The method of claim 6, there being an elongated earth-penetrating element secured to said platform assembly adjacent said base, said erecting step comprising the steps of causing said element to penetrate the earth during said earth-contacting step.

8. The method of claim 6, including the step of placing the end of said tongue remote from said assembly in contact with the earth in order to brace said assembly in said upright orientation thereof.

* * * * *